US006678080B2

United States Patent
Tervonen et al.

(10) Patent No.: US 6,678,080 B2
(45) Date of Patent: Jan. 13, 2004

(54) OPTICAL ADD/DROP MULTIPLEXER

(75) Inventors: Ari Tervonen, Vantaa (FI); Markku Oksanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/923,845

(22) Filed: Aug. 7, 2001

(65) Prior Publication Data

US 2002/0071156 A1 Jun. 13, 2002

Related U.S. Application Data

(63) Continuation of application No. PCT/FI00/00082, filed on Feb. 4, 2000.

(30) Foreign Application Priority Data

Feb. 8, 1999 (FI) .................................................. 990238

(51) Int. Cl.[7] ................................................ H04J 14/02

(52) U.S. Cl. ...................... 359/127; 359/130; 359/124; 359/179

(58) Field of Search ................................ 359/127, 130, 359/124, 179

(56) References Cited

U.S. PATENT DOCUMENTS

| | | | |
|---|---|---|---|
| 5,600,473 A | | 2/1997 | Huber |
| 5,706,375 A | * | 1/1998 | Mihailov et al. ...... 250/227.18 |
| 5,726,785 A | | 3/1998 | Chawki et al. |
| 5,748,349 A | | 5/1998 | Mizrahi |
| 5,822,095 A | | 10/1998 | Taga et al. |
| 5,850,301 A | * | 12/1998 | Mizuochi et al. ........... 359/124 |
| 5,926,300 A | | 7/1999 | Miyakawa et al. |
| 5,982,518 A | * | 11/1999 | Mizrahi ...................... 359/130 |
| 6,198,556 B1 | * | 3/2001 | Mizrahi ...................... 359/124 |

FOREIGN PATENT DOCUMENTS

| | | |
|---|---|---|
| DE | 19752944 A1 | 6/1998 |
| EP | 0835003 A1 | 4/1998 |
| EP | 0930741 A2 | 7/1999 |
| GB | 2315380 A | 1/1998 |
| GB | 2320152 A | 6/1998 |

* cited by examiner

Primary Examiner—Leslie Pascal
Assistant Examiner—David C Payne
(74) Attorney, Agent, or Firm—Squire, Sanders & Dempsey L.L.P.

(57) ABSTRACT

The invention concerns an optical add/drop multiplexer for the node of a telecommunications system. In the telecommunications system wavelength multiplexing is used to transmit along an optical fiber a main system signal including several different signals. The signals are transmitted each with its own wavelength and of the signals it is possible to drop and to add desired chosen optical signals having different wavelengths ($\lambda_1 \ldots \lambda_N$, (N>1)). The add/drop multiplexer includes a group formed by direction selective organs and wavelength selective organs. Several such groups are connected to each other by connecting to each other gates of direction selective organs in the group. At least some of the other gates of the direction selective organs in the groups are used as gates of the add/drop multiplexer, so that the type of each gate to be used is chosen from a set including a unidirectional add gate, a unidirectional drop gate and a bi-directional add/drop gate. In addition, to each bi-directional add/drop gate is connected a direction selective organ in order to separate different directions from each other. In the optical add/drop multiplexer it is hereby possible to choose the configuration of the add/drop multiplexer by combining groups in the desired way with each other, and within the chosen configuration the outputs and inputs of the different wavelengths can be chosen so that those wavelengths which experience most attenuation in the network will experience correspondingly less attenuation in the optical add/drop multiplexer.

10 Claims, 10 Drawing Sheets

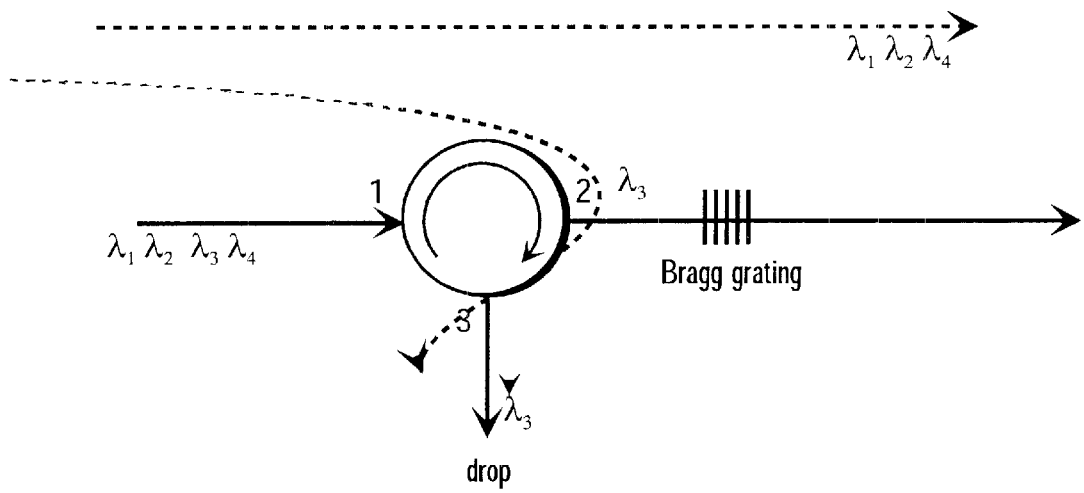
FIG. 2a
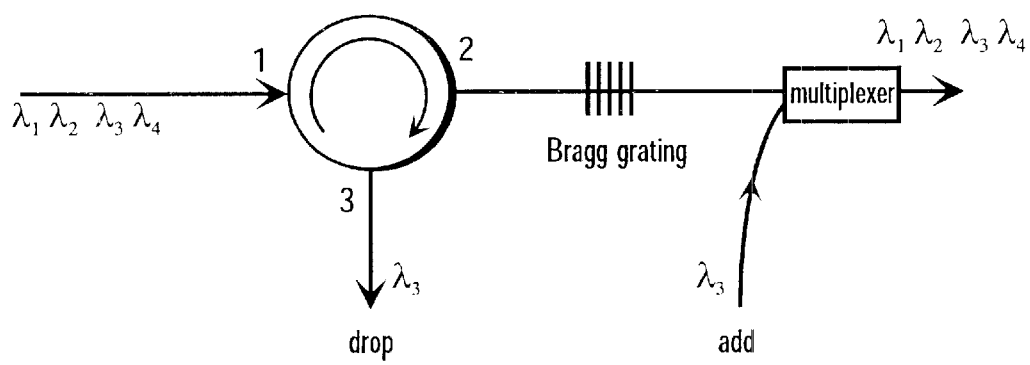
Kuva 2b

OPTICAL ADD/DROP MULTIPLEXER

This application is a continuation of international application serial No. PCT/FI00/00082, filed Feb. 4, 2000.

FIELD OF THE INVENTION

This invention relates generally to optical data transmission and especially to the optical add/drop multiplexing used in an optical data transmission system.

BACKGROUND OF THE INVENTION

The capacity of an optical fiber can be multiplied by increasing the number of different wavelengths to be conveyed in the fiber. This may be effectively implemented by Wavelength Division Multiplexing (WDM). In fiber optical systems, it is possible to use various WDM techniques, e.g. a unidirectional WDM technique or a bi-directional WDM technique. In the unidirectional technique, the WDM multiplexer at the transmitting end of the fiber combines the different wavelengths in the same fiber, while the WDM demultiplexer at the receiving end separates the different wavelengths from each other. In a bi-directional WDM system, information of different wavelengths is transmitted simultaneously in the same fiber in opposite directions. WDM systems using 4–20 different wavelengths for bit rates of 1–10 Gb/s a channel are available commercially, but in the near future systems of 32 and 40 wavelengths will also be commercially available. All different wavelengths travelling in the fiber can be amplified at the same time by using a linear optical fiber amplifier (OFA) in connection with the WDM technique. To use the resources as efficiently as possible, the amplifiers ought to be used at their full capacity in either direction.

Conventional telecommunications equipment uses only one optical signal, that is, at each end there are an optical transmitter and an optical receiver. In wavelength multiplexing, many such independent transmitter-receiver pairs use the same fiber, as was mentioned earlier, either in one direction or in two directions. On the output side of the system there is hereby an optical multiplexer, to the inputs of which are connected several optical conductors, in each of which a certain wavelength $\lambda_n$ is transmitted. FIG. 1 illustrates a system including N parallel transmitter-receiver pairs. Each source of information modulates one optical transmitter, of which each produces light at different wavelengths $\lambda_1 \ldots \lambda_N$ (N>1). The modulation bandwidth of each source is smaller than the interval between wavelengths, so that the spectra of modulated signals will not overlap. The signals produced by the transmitter are combined into the same optical fiber OF in a WDM multiplexer WDM1, which is an entirely optical (and often passive) component. The node of the optical bus may be an add/drop multiplexer (one or more; not shown in the figure), which through an optical fiber is connected with an entirely optical (and often passive) WDM demultiplexer WDM2, wherein a reverse operation is done on the multiplexing, in other words, every incoming wavelength $\lambda_n$ is separated to its own optical conductor. Thereupon, each signal is detected at its own receiver. A narrow wavelength window in a certain wavelength range is made available to the different signals. A typical system including e.g. four transmitter-receiver pairs in parallel could be such, wherein the signals are within a 1550 nm wavelength range, so that the first signal is in a wavelength range of 1544 nm, the second at a wavelength of 1548 nm, the third at a wavelength of 1552 nm and the fourth at a wavelength of 1556 nm. Nowadays a 100 GHz (about 0.8 nm) multiple is becoming the de facto standard for the distance between wavelengths, and this is also recommended by the ITU-T, so it has a strong official position.

Optical add/drop multiplexing (OADM) means that in an optical network different wavelengths are conveyed in the same fiber through the network, so that in a node of the network certain desired wavelengths are added and certain wavelengths are dropped. There are two kinds of OADM architecture: 1) all wavelengths are demultiplexed and combined again, whereby some wavelengths are dropped and added while some bypass the equipment transparently, or 2) only drop wavelengths are demultiplexed and only add wavelengths are multiplexed. Complete demultiplexing will cause unnecessary losses for all wavelengths, which of course is not desirable. The OADM structures may be either dynamic or static.

Central parameters for the functioning of the OADM are the following:

Attenuation of bypassing wavelengths (which means those wavelengths, which are directed through the optical add/drop multiplexer transparently from the input gate to the output gate) as they travel through the OADM multiplexer.

Cross-talk from bypassing wavelengths to drop outputs.

Attenuation of drop wavelengths as they pass through the OADM to the drop outputs.

Cross-talk from drop wavelengths to the outgoing fiber.

Attenuation of add wavelengths as they pass from the add inputs through the OADM.

Cross-talk from add wavelengths to the drop outputs.

In an optical loop network only a certain amount of attenuation is permissible between transmitter and receiver. The attenuation is formed by the a)–d) sum of the following items:

a) add attenuation of the transmitting node,
b) drop attenuation of the receiving node,
c) bypass attenuation of all nodes to be bypassed,
d) attenuation of all conveying fiber links.

When item d) is determined by the locations of the connections to be set up, the a)–d) sum must be made sufficiently small in the loop, so that it will fit into the remaining attenuation margin. Besides attenuation, another significant matter is to make cross-talks sufficiently small in the nodes of the loop, for the reason that they would not significantly reduce the signal quality in the drop outputs.

FIG. 2a) shows a simple optical drop device, which is based on the Fiber Bragg Grating and on a three-gate circulator. The Fiber Bragg Grating is a grating which is made into an optical fiber for a chosen wavelength and which reflects back the concerned wavelength in the opposite direction. To other wavelengths the grating is transparent, and the grating will let these waves through the grating without reflecting them. The circulator directs the light arriving from gate 1 out through gate 2 and the light arriving from gate 2 out through gate 3. In the case shown in the figure, the grating reflects back the wavelength $\lambda_3$ and then drops it through gate 3. Other wavelengths $\lambda_1$, $\lambda_2$ and $\lambda_4$ will pass through the grating. It is possible on the same path to add the add/drop functionality, whereby the same wavelength, which was dropped, may again be added, e.g. by a coupler, as is shown in FIG. 2b).

FIG. 2c) shows another simple add/drop device, the Mach-Zehnder interferometer (MZI), which typically includes two 3 dB 2×2 couplers and an optical path, which combine the output gates of the first coupler with the input gates of the second coupler. The first coupler divides the light wave arriving from either input gate (i1, i2) equally to two output gates of the concerned coupler. Of the sub-waves having a phase difference of π/2 after bypassing the coupler, each one propagates along its own path into the second coupler of the interferometer. With the aid of two couplers a complete cross-connection is formed, whereby the light wave connected from the top (bottom) input gate of the first coupler is obtained from the bottom (top) output gate of the second coupler. A complete cross-connection may also be implemented in such a way that on the optical paths combining the couplers there is a mirror or a grating reflecting the desired wavelength back in its direction of arrival, whereby the wave will pass twice through the same coupler (FIG. 2d). Hereby the wavelength connected from the first input gate and divided equally onto two optical paths will be reflected back to the same coupler and it will be connected out through the second input gate of the said coupler.

The optical transmission technique is being constantly developed in order to implement the lower levels of broadband network architectures as entirely optical systems, which would allow entirely optical relaying of high-capacity information flows (with the aid of optical cross-connection). E.g. optical loop networks are also well suitable for add/drop functions. The network can be flexibly configured according to the demands of traffic with the aid of add/drop devices, with which those wavelengths are chosen which are to be added/dropped. The type of signal to be used in the network may vary; the signal may be e.g. a Synchronous Digital Hierarchy (SDH) signal, a Plesiochronous Digital Hierarchy (PDH) signal or an Asynchronous Transfer Mode (ATM) signal.

Add/drop devices may be implemented e.g. in a WDM loop network including a number of N network nodes connected to each other by optical fiber links, so that they form a loop. There may be more than one optical fiber, and in each fiber several signals may travel with different wavelengths ($\lambda_1, \lambda_2 \ldots \lambda_N$). Special loop cases are the one-fiber loop and the two-fiber loop. In a one-fiber loop, the signals usually travel in one direction in the loop, either clockwise or anti-clockwise. It is also possible to implement bi-directional traffic in the same fiber. In regard to bi-directional traffic it is usual that with each different wavelength only one direction is in use in one link. In consequence of this, a connection can be set up between two adjacent nodes by the shortest route directly through the link only in one direction, whereas in the connection of the opposite direction the signals have to circle along a longer route around the loop. In a two-fiber loop the abovementioned problem does not occur. A connection can be formed between node pairs in two different circling directions. Hereby the signals will travel in two fibers in opposite circling directions in relation to each other and generally primarily using the shorter connection. Longer routes are standby routes in case of interference situations. For example, if the cable between the concerned nodes is damaged, the connection need not necessarily be cut off, since a longer route may then be used.

In the nodes of the loop add and drop signals with different wavelengths $\lambda_1 \ldots \lambda_N$ as well as signals bypassing the node are processed. The node adds an add signal to the WDM signal going to another node. The drop signal is a signal which the said node receives from another node and which is separated by the said node from the incoming WDM signal. The signals bypassing the node are signals between two other nodes which travel only through the node from a directly incoming fiber to an outgoing fiber, that is, the node directs the signals from the arriving WDM signal directly to the outgoing WDM signal. The signals are not changed into electric form and they are not processed electronically, but the OADM device carries out the necessary functionality entirely optically as regards the three different signal types mentioned earlier. An OADM device should usually be transparent to the signals. In practice, this means that it must be able within certain limits to deal with signals of different types that have e.g. different bit rates and other characteristics. E.g. add signals come to the device from telecommunications equipment located in the node. Drop signals again are directed from the OADM device to the telecommunications equipment in the node. The said equipment is not included in the OADM device, so the external signal processing performed by it is not essential from the viewpoint of this invention. More essential characteristics are mainly the wavelength and optical power of the signal.

Two special cases of loop network were studied above. A general case will be studied in the following which is a symmetrical loop of a complete connection. It is assumed that the network includes N network nodes and OADM devices located in these as well as optical fibers between the nodes. Hereby one optical fiber comes into each network node and one optical fiber goes out from each node. Thus, the loop network is a one-fiber loop, wherein bi-directional connections between all different node pairs are set up in one circling direction, either clockwise or anti-clockwise. One wavelength $\lambda_1$ is reserved for use by each node pair. Around the loop a connection can be set up between two node pairs along two different routes; on these routes bi-directional traffic is formed with the wavelength in question, whereby the reserved wavelength is used in all links of the loop. Hereby the concerned wavelength is both an add wavelength and a drop wavelength for each node of the node pair, but a bypassing wavelength for (N–2) nodes. As the number of nodes increases, the number of necessary wavelengths will also grow. At the same time, the proportion of wavelengths bypassing each node grows more than the proportion of add/drop wavelengths. When the number of nodes is N, the number of necessary wavelengths is the same as the number of various node pairs, that is, N(N–1)/2. The number of add/drop wavelengths in each node is the same as the number of other nodes, that is, N–1. The other wavelengths are bypassing wavelengths for the said node and their number is (N–2)*(N–1)/2. When two symmetrical one-fiber loops as described above, each with an opposite circling direction, are superimposed, a two-fiber loop is obtained which has standby connections.

Attenuation and dispersion are the most significant detrimental effects in optical data transmission. As the number of network nodes increases, attenuation will also grow. It is true that amplifiers may be added, but this is not a very desirable solutions, since amplifiers will add noise and also costs. At network level problems are also caused by the arrangement of a suitable wavelength specific amplification, because different wavelengths may travel along different routes, which may have quite big differences in length. Dispersion can be compensated for e.g. by the so-called Bragg chirped gratings. In this grating, the grating cycle varies linearly as a position function, owing to which the grating reflects different wavelengths from different points and will thus cause different delays for different frequencies. In a conventional fiber, dispersion will usually cause longer delays for low-frequency components. Chirped gratings are used explicitly to cause longer delays to components of higher frequencies and in this way to compensate for delay differences. In practical implementations the band must be very narrow, that is, a separate grating is chosen for each desired wavelength.

The invention is intended to bring about a solution by which drawbacks relating to attenuation can be reduced, while at the same time a network is implemented with a better cost efficiency.

BRIEF SUMMARY OF THE INVENTION

The invention concerns optical add/drop multiplexing used in an optical data transmission system. It is an objective of the invention to bring about a solution reducing the drawbacks presented above, which relate to optical data transmission, mainly to attenuation and cost efficiency. The established objective is achieved in the manner presented in the independent claims.

The inventive idea is to implement an OADM device by using a group formed of two direction selective organs and of one or more wavelength selective organs located in between, by connecting several such groups together in a manner suitable for each node and by forming several add inputs and drop outputs of the gates of the direction selective organs, which input and output gates can be further selected so that any attenuation caused by the said device is optimised in the best possible way in view of the whole telecommunications network. Owing to the solution according to the invention, the configurations of the add/drop devices can be optimised as regards losses of those connections which are most critical (longest) as regards network attenuation, and in this way as small an attenuation as possible can be obtained for the concerned connections in the OADM device itself. The solution also provides a very systematic way of reducing the total attenuation at network level, which way is also versatile as regards its implementation alternatives, because the optimising can be carried out for one node at a time, both by choosing a device configuration which is suitable for the concerned node and by choosing, within the chosen configuration, such gates for use which are optimum gates in regard to the different wave lengths. Owing to the solution according to the invention, there is also less need than before for optical amplifiers which increase noise and costs.

The add/drop devices are implemented by using optical Fiber Bragg Grating as the wavelength selective organs and optical circulators as the direction selective organs. Alternatively, the individual group can be implemented with the aid of a Mach-Zehnder interferometer. The attenuation is optimised by choosing separately for each application a manner of arrangement of either gratings and circulators or, alternatively, Mach-Zehnder interferometers containing Fiber Bragg Gratings, for the transmission and add-drop connections.

In an advantageous embodiment of the invention chirped gratings for compensating for dispersion are used for those wavelengths which require compensation.

Using the optical add/drop multiplexing device according to the invention advantages are achieved compared with conventional solutions, the most important advantage being the possibility to optimise the OADM devices for the most critical connections and, secondly, the possibility to perform separately for each wavelength both dispersion compensation and reflection by using the grating.

In technical terms, the add/drop device in accordance with the invention can be implemented e.g. in a WDM loop network.

LIST OF FIGURES

In the following, the invention will be described in greater detail with the aid of the appended schematic figures, of which FIG. 1 illustrates an optical transmission system using wavelength multiplexing;

DETAILED DESCRIPTION OF THE INVENTION

Figure 6:
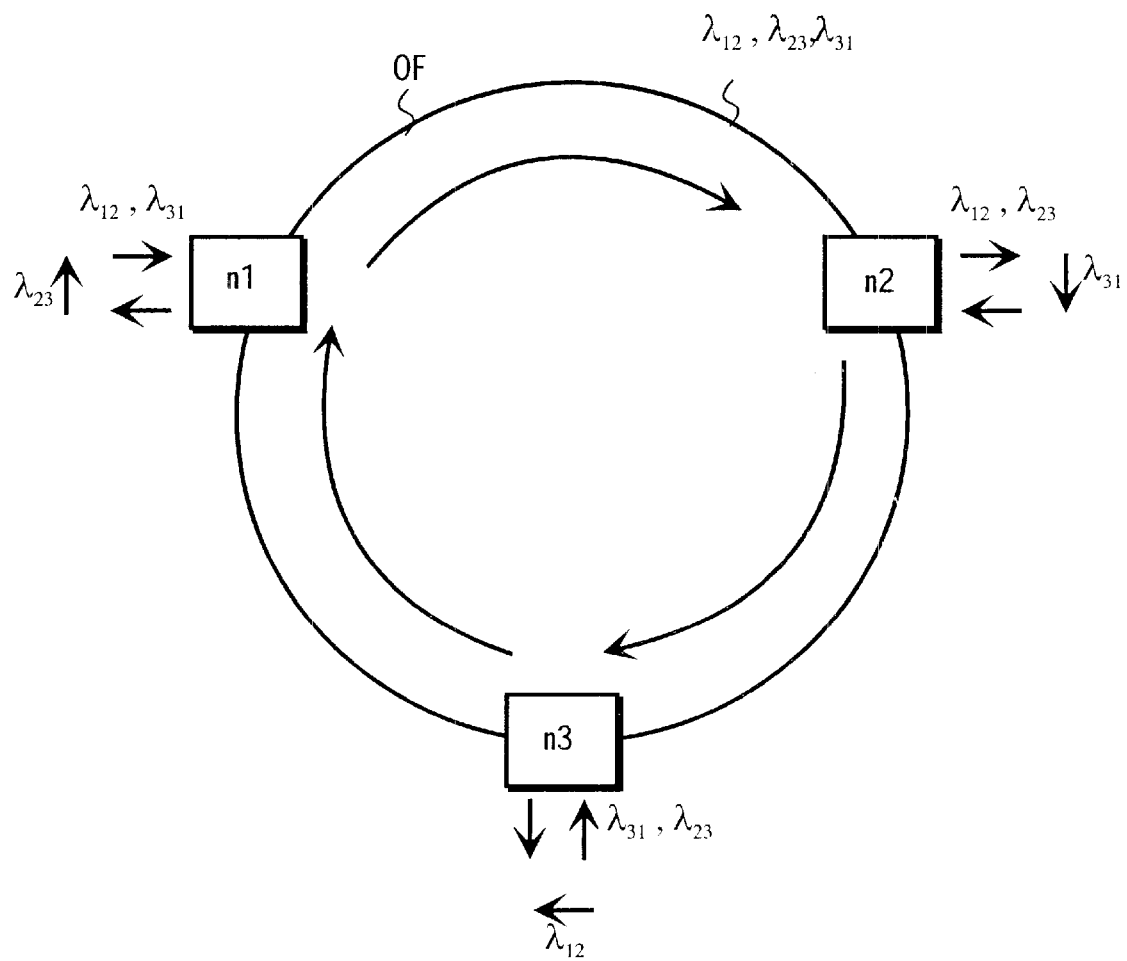
FIG. 6 shows a symmetrical OADM link.

Add/drop multiplexers in accordance with the invention in a symmetrical optical WDM loop network are examined (FIG. 6). There may be a number of N nodes in the network, but in this example we will study just three nodes (n1–n3). Although the figure shows the distances between nodes as being of equal length, the distances may vary very much in practice. In addition, the network includes OADM devices in the network nodes and optical fibers between the nodes. The solution according to the invention is limited to static OADM solutions. In this case shown as an example, there are three different wavelengths travelling in the fiber: $\lambda_{12}$ is reserved for use by node pair n1 and n2, $\lambda_{23}$ for use by node pair n2 and n3 and $\lambda_{31}$ for use by node pair n3 and n1. In the loop, a connection can be set up between two node pairs along two different routes, whereby a bi-directional traffic is formed on these routes with the wavelength in question and the reserved wavelength is used in all links of the loop. The said wavelength is then both an add wavelength and a drop wavelength for each node in the node pair, but a bypassing wavelength for the third node. In FIG. 6, wavelength $\lambda_{12}$ travels from node n1 in a clockwise direction to node n2. In node n2, $\lambda_{12}$ is dropped, and when a connection is set up from node n2 to node n1, $\lambda_{12}$ must be added, and it now travels the distance between the node pair along a physically longer route bypassing node n3. Correspondingly, wavelengths $\lambda_{23}$ and $\lambda_{31}$, of which the first-mentioned travels between the node pair n2 and n3 and the latter between the node pair n1 and n3. Thus, wavelength $\lambda_{23}$ travels in a clockwise direction from node n2 to node n3 and from node n3 to node n2 likewise in a clockwise direction bypassing node n1. As shown in the figure, wavelength $\lambda_{31}$ travels from node n3 to node n1 along the short route and from node n1 to node n3 along a longer route, bypassing node n2. Wavelength $\lambda_{12}$ is both an add wavelength and a drop wavelength for nodes n1 and n2, correspondingly, wavelength $\lambda_{23}$ is both an add wavelength and a drop wavelength for nodes n2 and n3 and wavelength $\lambda_{31}$ for nodes n1 and n3.

However, the optical add/drop multiplexer (OADM) is not limited only to that which was presented above; the traffic in the loop need not be symmetrical. What is essential from the viewpoint of the invention is that:

OADM deals with one fiber in the loop where there is traffic in one direction. In a loop with several fibers, there is a separate OADM for each fiber in each node.

The wavelengths of the WDM signal are divided into two groups: 1) add/drop wavelengths, 2) bypassing wavelengths. If, for example, the wavelength is an add wavelength, it is also a drop wavelength for a certain same node.

The bypassing wavelengths are directed from the WDM signal of the incoming fiber to the WDM signal of the outgoing fiber.

Drop wavelengths are directed in the OADM from the incoming fiber each to its own drop fiber output.

Add wavelengths are directed to the outgoing fiber each from its own add fiber input.

The invention includes several ways of implementing the presented OADM by combining Fiber Bragg Gratings and optical circulators in different ways or alternatively by combining Mach-Zehnder interferometers containing Fiber Bragg Gratings. Some ways of implementation are studied in the following with the aid of six examples. It should be noted that the example describes the travel route of different wavelengths in detail in each piece of equipment without describing various propagation delays, attenuation or dispersion, which will be studied after the examples.

Figure 1:
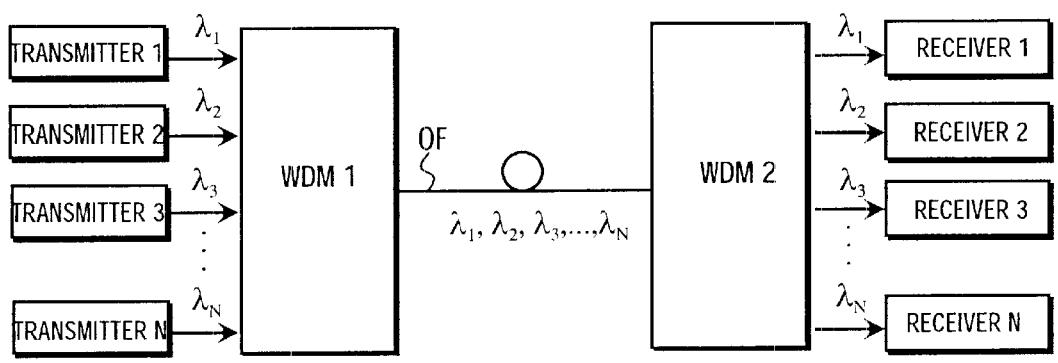
Figure 2C:
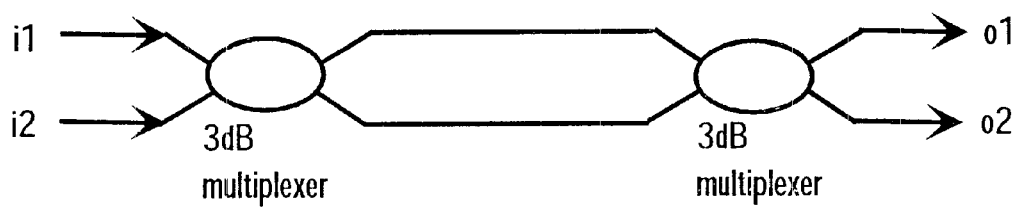
FIG. 2 shows an add/drop device based on Fiber Bragg Gratings, wherein FIGS. 2a) shows a drop device, 2b) a combined add/drop device, 2c) a Mach-Zehnder interferometer and 2d) a Mach-Zehnder interferometer containing a grating.
Figure 2D:
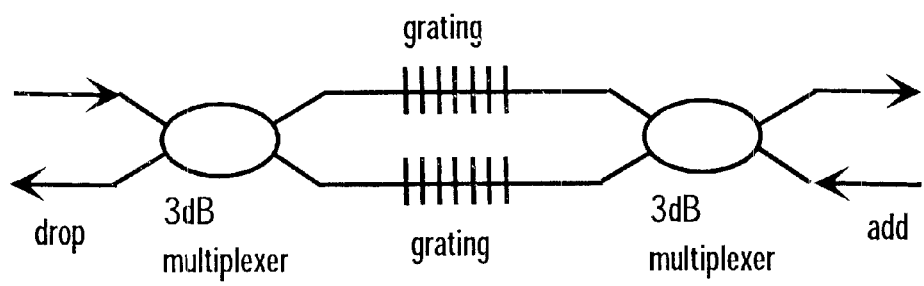
Figure 3:
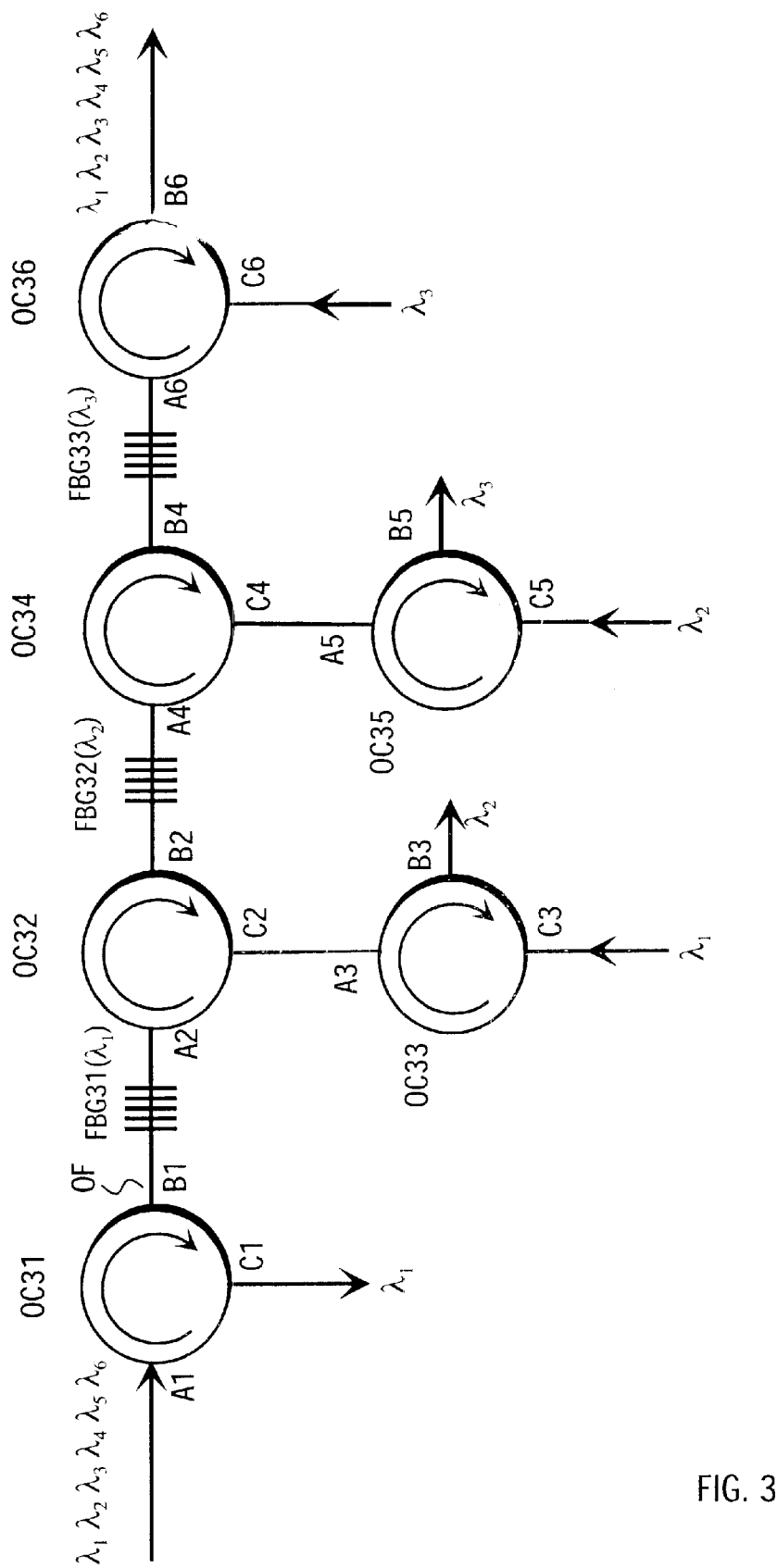
FIG. 3 shows a first embodiment of the invention based on Fiber Bragg Gratings and optical circulators.

The following is a detailed study of the add/drop device in accordance with the invention with the aid of six different examples of embodiments. In the add/drop device of examples 1–3 there are several optical circulators and several optical Fiber Bragg Gratings connected functionally to each other through an optical fiber. In the example, the optical circulator is a three-gate (e.g. in FIG. 3, gates A1, B1, C1 in the first circulator (OC31)) component which between the different gates sets up direction-dependent optical connections so that when e.g. light is connected in from the first gate (A1), it will be directed to the second gate (B1). Light connected in through the second gate (B1) will for its part be directed to the third gate (C1).

With the aid of examples 4–6 add/drop device solutions of a corresponding kind as those in examples 1–3 are presented, but using Mach-Zehnder interferometers containing Fiber Bragg Gratings. In all six examples mentioned above there are both direction selective organs and wavelength selective organs connected to each other so that any attenuation caused by the said add/drop device will be optimised as well as possible for bypassing wavelengths, add wavelengths and drop wavelengths.

EXAMPLE 1

It is assumed, that in our example there is a number of N circulators and a corresponding number of different wavelengths ($\lambda_1, \ldots \lambda_N$). There are three gates in each circulator. On the path of the bypassing wavelengths there are circulators and Fiber Bragg Gratings in turn one after the other, so that the first organ and the last organ are circulators. In addition, the structure contains separate circulators connected to the path of bypassing wavelengths for the wavelengths to be added and dropped. The above-mentioned structure is examined with the aid of FIG. 3; the structure is presented so that N=6. The different wavelengths ($\lambda_1, \lambda_2, \lambda_3, \lambda_4, \lambda_5, \lambda_6$) arrive through the input gate of the OADM device along an optical fiber, which fiber is functionally connected to the first gate (A1) of the first circulator (OC31). The optical circulators (OC31, OC32, OC34, OC36) and Fiber Bragg Gratings (FBG31($\lambda_1$), FBG32($\lambda_2$), FBG33($\lambda_3$)) are transparent to the bypassing wavelengths ($\lambda_4, \lambda_5, \lambda_6$), which are directed from the input of the add/drop device directly through the said optical circulators and Fiber Bragg Gratings to the output of the add/drop device, which output is the same as the second gate (B6) of the last (sixth) optical circulator (OC36). In the foregoing, such a manner of marking the Fiber Bragg Grating was used, wherein after the abbreviation FBG the first figure is the consecutive number of the picture and the second one is the consecutive number of the circulator, while within parenthesis that wavelength is stated which the concerned grating reflects back in the direction of arrival of the wave. With the exception of the first and sixth optical circulator, an optical circulator (OC33, OC35) is connected to the third gate (C2, C4) of each circulator (OC32, OC34) located on the path of every other bypassing wavelength, for the wavelengths to be added and dropped. The said optical circulator has separate add inputs (C3, C5) and drop outputs (B3, B5). In the manner described above, the Fiber Bragg Gratings located on the path of bypassing wavelengths are located between the circulators on the path so that each grating will reflect back the chosen drop wavelength (e.g. grating FBG31($\lambda_1$) to the circulator (OC31) preceding the grating of the wavelength $\lambda_1$). This circulator directs the said wavelength out of the third gate, whereby in the case of the first circulator it is dropped from the third gate (C1) of the first circulator. On the other hand, in the case of the circulators located on the path of other bypassing wavelengths, in this example the second and fourth circulator (OC32, OC34), the drop wavelength is directed to a circulator (OC33, OC35) which is functionally connected to the third gate of the above-mentioned circulators and from the second gate (B3, B5) of which the drop wavelength ($\lambda_2, \lambda_3$) is dropped. The first add wavelength ($\lambda_1$) is directed in through the third gate (C3) of the third circulator and further through the first gate (A3) to an optical fiber, which is connected to a second circulator (OC32) located on the path of the bypassing wavelengths. From the said circulators, the wave is directed to the Fiber Bragg Grating (FBG31($\lambda_1$)), which precedes the said circulator and which reflects back the wave to the circulator, which directs it further to the path of bypassing wavelengths where the said wavelength bypasses transparently the other circulators and gratings located on this path. Correspondingly, the second add wavelength ($\lambda_2$) is directed in through the third gate (C5) of the fifth circulator and further through the first gate (A5) to the optical fiber, which is functionally connected to the fourth circulator (OC34), and it is directed to the Fiber Bragg Grating (FBG32($\lambda_2$)) which precedes the circulator and from which it is reflected back to the said circulator, and it then travels further on the path of bypassing wavelengths to the output of the add/drop device. To the last circulator of the path of bypassing wavelengths, in this example to the sixth circulator (OC36), that last add wavelength($\lambda_3$) is directed from the third gate (C6), which is intended for the longest connection, because the said wavelength will experience least attenuation (like the wavelength $\lambda_1$ dropped from the first circulator) in the OADM device. The wavelength $\lambda_3$ ($\lambda_1$) travels through one circulator and one Fiber Bragg Grating.

EXAMPLE 2

Figure 4:
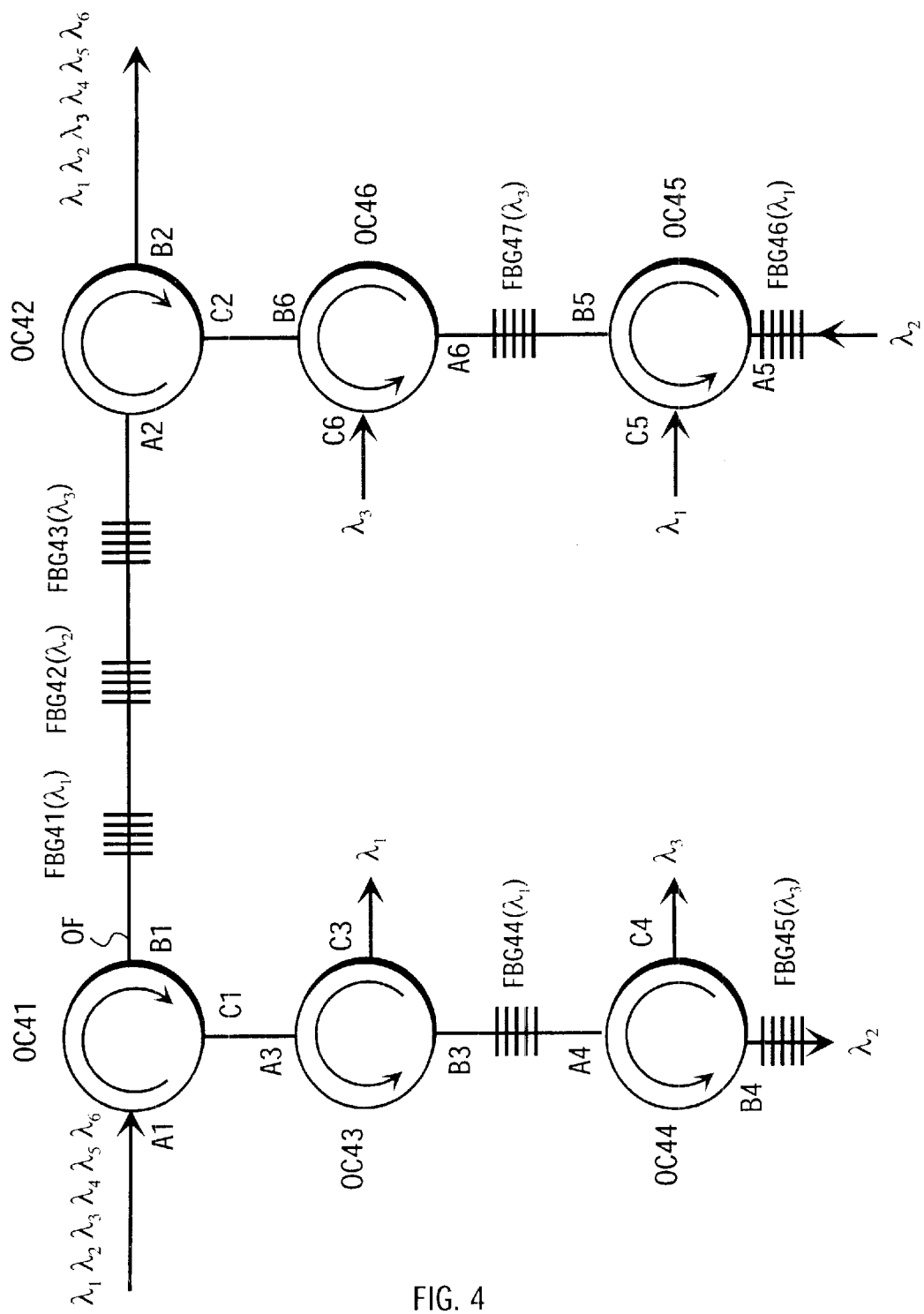
FIG. 4 shows a second embodiment of the invention based on Fiber Bragg Gratings and optical circulators.

It is assumed, that in this example of ours there are N three-gate circulators and a corresponding number of different wavelengths ($\lambda_1 \ldots \lambda_N$). On the path of bypassing wavelengths there are two circulators, so that between the said circulators there are several Fiber Bragg Gratings in succession. In addition, the structure for drop wavelengths includes a separate set formed of circulators and gratings in turn and in succession, which set is connected to the third gate of the first circulator on the path of bypassing wavelengths. Correspondingly, for add wavelengths a set is formed of circulators and gratings connected in turn one after the other, which set is connected to the third gate of the second circulator on the path of bypassing wavelengths. The structure presented above is now studied with the aid of FIG. 4; the structure is presented so that N=6. From the input gate of the OADM device along an optical fiber, which is functionally connected to the first gate (A1) of the first circulator (OC41), a signal arrives, which includes different signals, each one of them having its own wavelength ($\lambda_1$, $\lambda_2$, $\lambda_3$, $\lambda_4$, $\lambda_5$, $\lambda_6$). On the path of bypassing wavelengths there are two circulators (OC41, OC42), which are connected functionally in succession so that between them are located in succession three Fiber Bragg Gratings (FBG41($\lambda_1$), FBG42($\lambda_2$), FBG43($\lambda_3$)) for add and drop wavelengths ($\lambda_1$, $\lambda_2$, $\lambda_3$). The bypassing wavelengths ($\lambda_4$, $\lambda_5$, $\lambda_6$) are directed through the above-mentioned organs transparently from the input gate of the OADM device to the output gate. To the third gate of the first circulator on the path of bypassing wavelengths a third and fourth circulator (OC43, OC44) are connected functionally in succession, and the second gate of these organs is connected in such a way to the Fiber Bragg Grating (FBG44($\lambda_1$), FBG45($\lambda_3$)) that the third circulator is connected to the fourth grating while the fourth circulator is connected to the fifth grating. As in the first example, the gratings are located here in such a way on the optical bus starting from the second gate of the circulators that the grating will reflect back the desired drop wavelength in the direction of arrival to the circulator preceding the grating. With the aid of the above-mentioned set of circulators and Fiber Bragg Gratings the wavelengths to be dropped ($\lambda_1$, $\lambda_2$, $\lambda_3$) are directed each from its own output gate: the first wavelength ($\lambda_1$) to be dropped is dropped from the third gate (C3) of the third circulator (OC43), the second wavelength ($\lambda_2$) to be dropped is dropped from the second gate (B4) of the fourth circulator (OC44) and the third wavelength to be dropped is dropped from the third gate (C4) of the said circulator. Correspondingly, to the third gate (C2) of the second circulator on the path of bypassing wavelengths two circulators (OC46, OC45) are connected functionally in succession and the second gate of these organs is connected to a Fiber Bragg Grating (FBG47($\lambda_3$), FBG46($\lambda_1$)) on a similar principle as was presented above for the wavelengths to be dropped. Each add wavelength has an input gate of its own, so that wavelength $\lambda_1$ is added from the third gate (C5) of the fifth circulator (OC45), wavelength $\lambda_2$ is added from the first gate (A5) of the said circulator and wavelength $\lambda_3$ is added from the third gate (C6) of the sixth circulator (OC46). When the gratings and circulators are connected in succession as described above, wavelengths to be added can be directed onto the path of bypassing wavelengths so that the add wavelengths will travel twice through the second circulator. The first time, the add wavelengths travel in through the third gate of the second circulator and exit through the first gate. The second time, the said wavelengths travel in the circulator, when the grating corresponding to each wavelength reflects back the concerned wave on the same way to the circulator, which will direct the signal out through the second gate, which gate is also the output of the OADM device.

EXAMPLE 3

Figure 5:
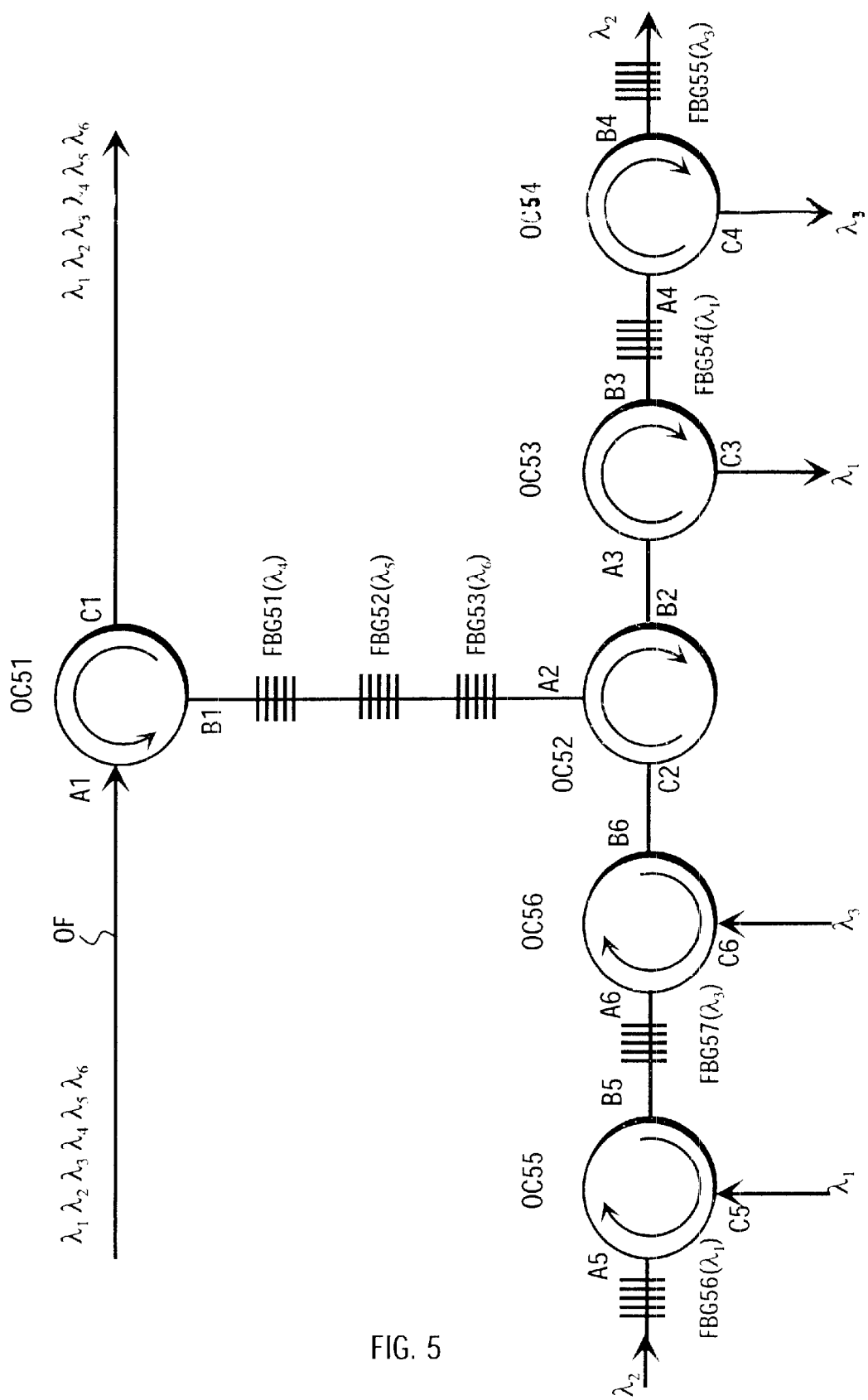
FIG. 5 shows a third embodiment of the invention based on Fiber Bragg Gratings and optical circulators.

It is assumed, that in this example of ours there are N three-gate circulators and a corresponding number of different wavelengths ($\lambda_1 \ldots \lambda_N$). On the path of bypassing wavelengths there are two circulators so that between the said circulators there are several Fiber Bragg Gratings in succession. In addition, the structure includes for add wavelengths a separate set formed of circulators and gratings in turn and in succession, which set is connected to the third gate of the second circulator on the path of bypassing wavelengths. Correspondingly, for drop wavelengths a set is formed of circulators and gratings connected in turn one after the other, which set is connected to the second gate of the second circulator on the path of bypassing wavelengths. The structure presented above is now studied with the aid of FIG. 5; the structure is presented so that N=6. From the input gate of the add/drop device along an optical fiber, which is functionally connected to the first gate (A1) of the first circulator (OC51), a signal arrives, which includes six different wavelengths ($\lambda_1$, $\lambda_2$, $\lambda_3$, $\lambda_4$, $\lambda_5$, $\lambda_6$). The said circulator is located on the path of bypassing wavelengths and the bypassing wavelengths ($\lambda_4$, $\lambda_5$, $\lambda_6$) travel twice through the said circulator. The second gate (B1) of the circulator is connected functionally to the first gate (A2) of the second circulator (OC52), so that between the said circulators there are in succession three Fiber Bragg Gratings (FBG51($\lambda_4$), FBG52($\lambda_5$), FBG53($\lambda_6$)) which reflect back the bypassing wavelengths ($\lambda_4$, $\lambda_5$, $\lambda_6$) to the first circulator and further out through its third gate (C1), which output is also the output of the add/drop device. The Fiber Bragg Gratings are connected in succession so that the wavelength ($\lambda_4$) reserved for the longest connection is reflected from the first grating (FBG51($\lambda_4$)), whereby it will experience least attenuation in the add/drop device. Thereupon those wavelengths ($\lambda_5$, $\lambda_6$) will be reflected, which are reserved for the next most critical connections, from gratings FBG52($\lambda_5$) and FBG53($\lambda_6$). According to the figure, on the right side of the second circulator, that is, to its second gate (B2) a third and fourth circulator (OC53, OC54) are connected functionally in succession, so that the second gate of these circulators is connected by way of an optical fiber in such a way to a Fiber Bragg Grating that a fourth grating (FBG54($\lambda_1$)) remains between the said circulators. The gratings are located in succession together with the circulators in such a way that the grating will reflect back two drop wavelengths ($\lambda_1$, $\lambda_3$) to the circulator, which is located in the direction of arrival and which directs the drop wavelength out through the third gate (C3, C4). The third drop wavelength ($\lambda_2$) is dropped from the second gate (B4) of the fourth circulator. Correspondingly, on the left side of the second circulator there are for add wavelengths ($\lambda_1$, $\lambda_2$, $\lambda_3$) a fifth and a sixth circulator (OC55, OC56), which are connected functionally to the third gate (C2) of the mentioned circulator through an optical fiber, so that the first gate of each above-mentioned organ is connected to a Fiber Bragg Grating so that of the add wavelengths two ($\lambda_1$, $\lambda_3$) will be reflected back to the circulator in the direction of arrival. The fifth circulator is connected to the sixth grating (FBG56($\lambda_1$)) and the sixth circulator is connected to the seventh grating (FBG57($\lambda_3$)). Each add wavelength has an input gate of its own, so that the first wavelength ($\lambda_1$) is added from the third gate (C5) of the fifth circulator (OC55), the second add wavelength ($\lambda_2$) is added from the first gate (A5) of the above-mentioned circulator and the third add wavelength ($\lambda_3$) is added from the third gate (A6) of the sixth circulator (OC56). Of the add wavelengths, wavelength $\lambda_2$ travels through the said circulators and gratings and further through the second circulator onto the path of bypassing wavelengths. The other add wavelengths ($\lambda_1$, $\lambda_3$) travel a similar route, but before this they have been reflected from the gratings (FBG56($\lambda_1$), FBG57($\lambda_3$)) preceding the above-mentioned circulators (OC55, OC56).

With the aid of the following examples 4–6 such solutions are studied which allow implementation of the add/drop device by Mach-Zehnder interferometers. The Mach-Zehnder interferometers are connected to each other in such a way that any attenuation caused by the said device can be optimised as well as possible for bypassing add and drop wavelengths.

EXAMPLE 4

Figure 7:
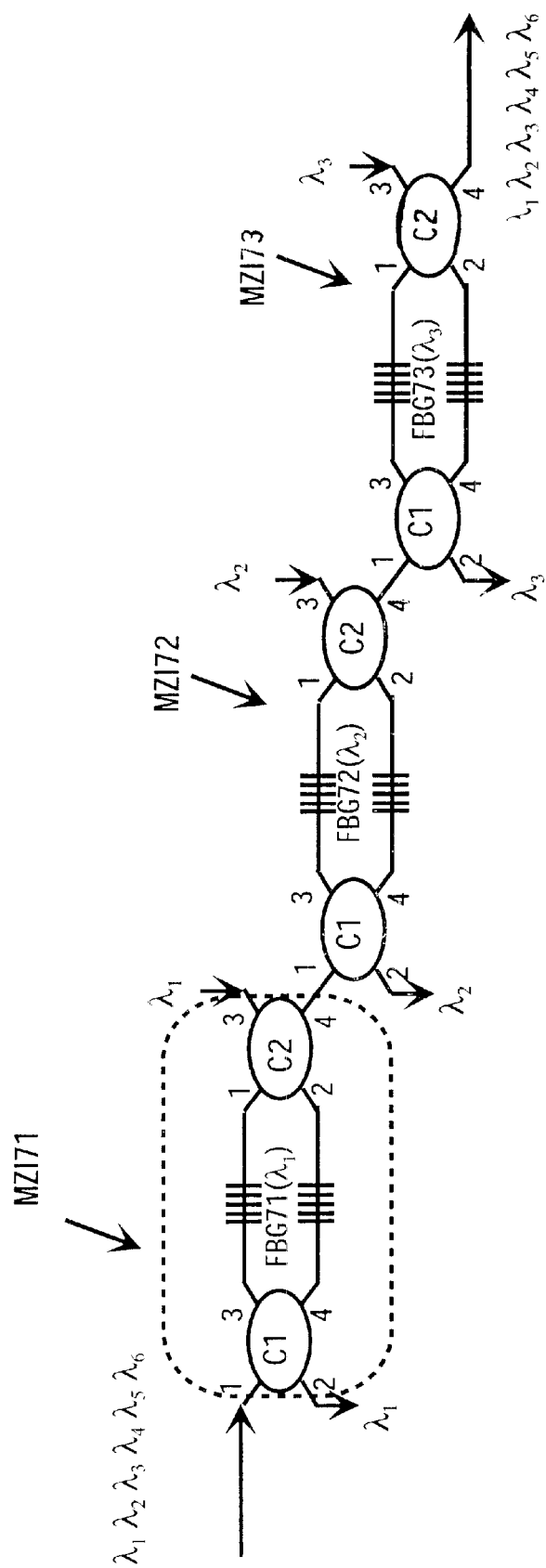
FIG. 7 shows a fourth embodiment of the invention based on Mach-Zehnder interferometers.

The Mach-Zehnder interferometer (MZ171) according to FIG. 7 consists of two 2×2 couplers, which couplers are connected together by an optical fiber, so that the output gates (3, 4) of the first coupler (C1) are connected to the input gates (1, 2) of the latter coupler (C2). In addition, on the paths connecting the couplers there is a Fiber Bragg Grating (FBG71($\lambda_1$)) chosen for the add/drop wavelength. The paths of the interferometer are identical, whereby the light intensity and phase relations of the different paths will remain. The add/drop device in the figure includes three successive interferometers as described above, so that the output gate 4 of the preceding interferometer is connected to the input gate 1 of the following interferometer. Six different wavelengths ($\lambda_1$, $\lambda_2$, $\lambda_3$, $\lambda_4$, $\lambda_5$, $\lambda_6$) arrive in the first interferometer from the input gate 1 of the first coupler (C1). The coupler divides the incoming signal into two parts and directs each part from its own output gate (3, 4) to an optical fiber. The sub-waves exiting from the coupler have a mutual phase difference of $\pi/2$. The Fiber Bragg Grating FBG71($\lambda_1$) of the first interferometer reflects the wavelength $\lambda_1$ back to the coupler and the output gates of the coupler now function as input gates. The light now travels for the second time through the same coupler, that is, it experiences a complete cross-connection, in consequence of which all back-switched light ($\lambda_1$) will be dropped from gate 2 of the coupler. From gate 3 of the second coupler (C2) of the interferometer wavelength $\lambda_1$ is added to replace the dropped wavelength. The coupler divides the wavelength equally to the fibers going out from gates 1 and 2 in the same way as the coupler described earlier, in other words, the coupler functions in the same manner also when the direction of light travel is the opposite, whereby the role of the gates is also reversed, that is, the input gates will function as output gates. Each sub-wave is reflected back from the grating on the path in the direction of arrival and is directed to the output gate 4. The above-mentioned grating is transparent to the different wavelengths $\lambda_2$, $\lambda_3$, $\lambda_4$, $\lambda_5$ and $\lambda_6$. These five bypassing wavelengths also travel twice through the coupler; the two couplers (C1, C2) form a complete cross-connection, whereby the signal connected in through the input gate 1 of the first coupler is obtained from the output gate 4 of the second coupler. The second and third interferometer (MZ172, MZ173) operate in a similar manner as the first, however, so that the add/drop wavelength of the second interferometer is $\lambda_2$ and the add/drop wavelength of the third interferometer is $\lambda_3$. The output gate 4 of the third interferometer is also the output of the whole device.

EXAMPLE 5

Figure 8:
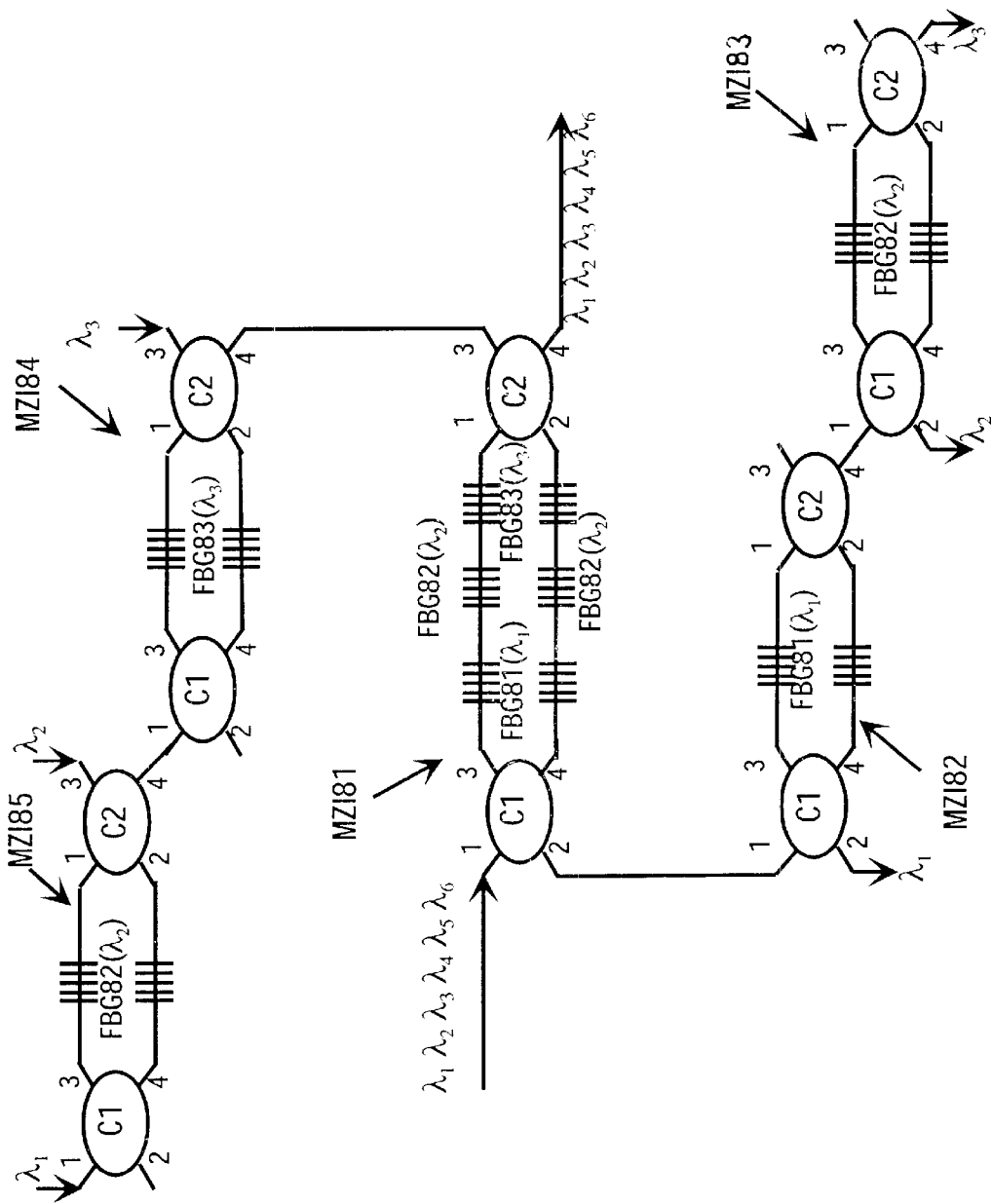
FIG. 8 shows a fifth embodiment of the invention based on Mach-Zehnder interferometers.

The add/drop device shown in FIG. 8 includes four Mach-Zehnder interferometers (MZ182–MZ185) of the kind described above and, in addition, one Mach-Zehnder interferometer (MZ181) which consists like the above-mentioned interferometers of two 2×2 couplers, but on the optical paths connecting its couplers there are three Fiber Bragg Gratings (FBG81($\lambda_1$), FBG82($\lambda_2$), FBG83($\lambda_3$)) instead of one Fiber Bragg Grating. From gate 1 of the first interferometer (MZ181) six wavelengths ($\lambda_1$, $\lambda_2$, $\lambda_3$, $\lambda_4$, $\lambda_5$, $\lambda_6$) are directed to the first coupler (C1), which wavelengths are divided through output gates (3, 4) to two optical fibers, where the Fiber Bragg Gratings will reflect back the drop wavelengths ($\lambda_1$, $\lambda_2$, $\lambda_3$) to the same coupler. The coupler directs the said wavelengths from the output gate 2 of the said interferometer to an optical fiber, which fiber is connected to the input gate 1 of the second interferometer (MZ182). This interferometer, like the interferometer (MZ183) connected to its output gate 4, is for drop wavelengths. The second interferometer drops wavelength $\lambda_1$ from gate 2 of the first coupler (C1) of the said interferometer and the third interferometer drops wavelength $\lambda_2$ from gate 2 of the first coupler (C1) of the said interferometer and, in addition, wavelength $\lambda_3$ from gate 4 of the second coupler (C2). Output gate 4 of the fourth interferometer (MZ184) is connected functionally to gate 3 of the second coupler of the first interferometer. Input gate 1 of the fourth interferometer is connected to output gate 4 of the fifth interferometer (MZ185). With the aid of the above-mentioned two interferometers, wavelengths ($\lambda_1$, $\lambda_2$, $\lambda_3$) are added so that wavelength $\lambda_1$ is added from input gate 1 of the fifth interferometer and wavelength $\lambda_2$ is added from gate 3 of the second coupler of the same interferometer. Wavelength $\lambda_3$ is added from gate 3 of the second coupler of the fourth interferometer. Output gate 4 of the first interferometer is at the same time the output for the whole add/drop device.

EXAMPLE 6

Figure 9:
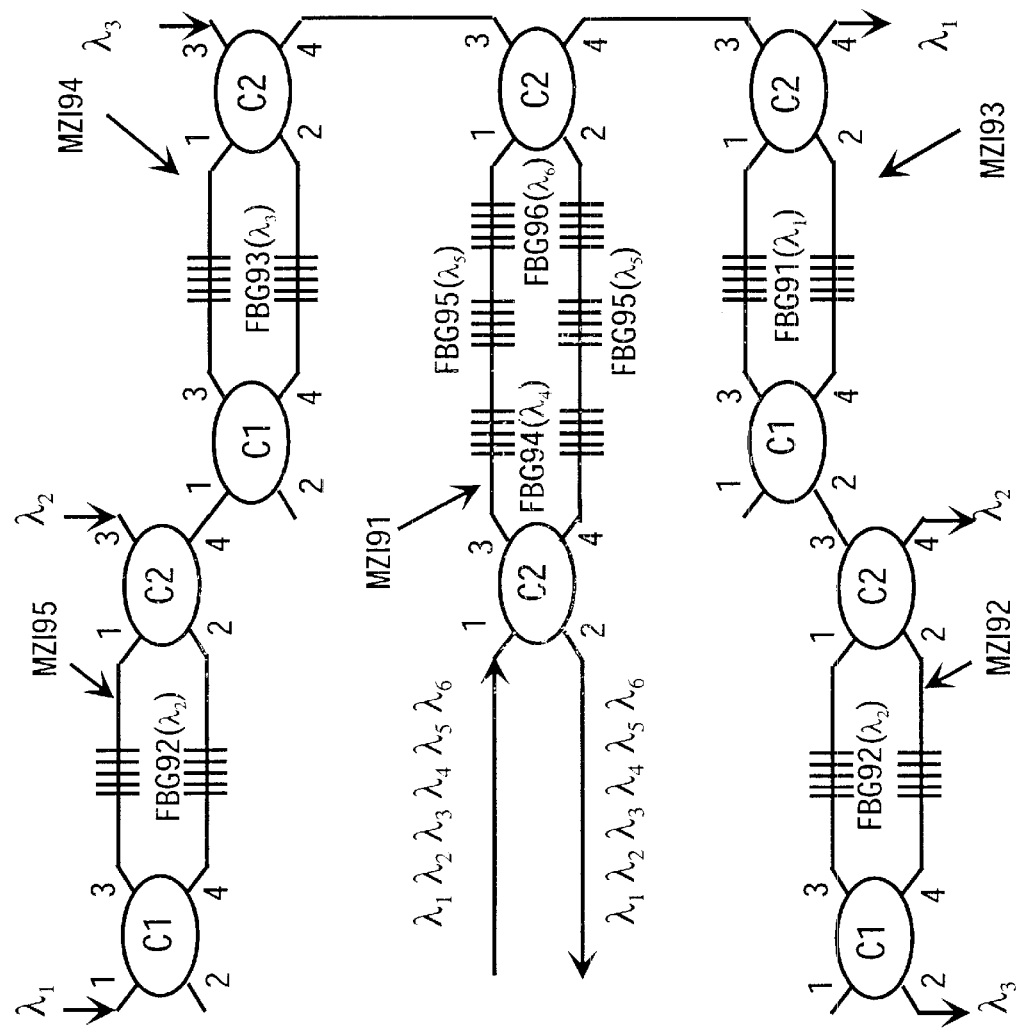
FIG. 9 shows a sixth embodiment of the invention based on Mach-Zehnder interferometers.

The add/drop device shown in FIG. 9 includes interferometers (MZ191–MZ195) of the same kind as in example 5, which interferometers are connected so that those interferometers, which are used for adding desired wavelengths ($\lambda_1$, $\lambda_2$, $\lambda_3$) connected in succession form an own 'branch of add wavelengths', while those interferometers, which are used to drop chosen wavelengths ($\lambda_1$, $\lambda_2$, $\lambda_3$) connected in succession form another own 'branch of drop wavelengths'. Bypassing wavelengths ($\lambda_4$, $\lambda_5$, $\lambda_6$) are reflected back by Fiber Bragg Gratings (FBG91($\lambda_4$), FBG92($\lambda_5$), FBG93($\lambda_6$)) of the first interferometer to the first coupler of the said interferometer and they are directed out through the second gate of the said coupler, which gate is also the output gate of the add/drop device. The fourth and fifth interferometers of this example are similar to the corresponding interferometers of example 8 and they are also connected to each other and to the first interferometer in a similar manner. The second and third interferometers are connected in such a way that gate 3 of the second coupler of the second interferometer is connected functionally to output gate 4 of the first interferometer and gate 2 of the first coupler of the second interferometer is connected to gate 3 of the second coupler of the third interferometer. Wavelength $\lambda_1$ is dropped from output gate 4 of the second interferometer and wavelength $\lambda_2$ is dropped from output gate 4 of the third interferometer, while wavelength $\lambda_3$ is dropped from the second input gate of the same interferometer now functioning as an output gate. The input gate of the first interferometer now functioning as an output gate is also the output of the add/drop device.

For the practical application the most suitable structure is chosen of those presented above. It should be noted in particular, that the attenuation of the different add/drop wavelengths (and of also of bypassing wavelengths in example 3 (example 6)) is different depending on in which order the gratings of the different wavelengths are located. In the loop the longest connections are the most critical ones, because most attenuation arises in them, so special attention is paid to the optimising of long connections.

As regards attenuation, the structure of example 1 (example 4) contains more attenuation from the viewpoint of bypassing wavelengths (compared to examples 2 and 3 (to examples 5 and 6)), because there are more circulators (couplers) on the path. On the other hand, the attenuation of the first drop wavelength and of the last add wavelength remain small. It is hereby most advantageous to choose the above-mentioned wavelengths for the longest connections of the said node. The structure of example 1 (example 4) is also suitable for small loops, where there are not several signals bypassing the node.

In the structure of example 2 (example 5) there are only two circulators (couplers) for bypassing wavelengths and passing through the gratings of add/drop wavelengths. The separation of add/drop wavelengths can be done in an order optimising the attenuation of the longest connections.

In the structure of example 3 (example 6), the separation of bypassing wavelengths can also be done in such an order which optimises the attenuation for the longest connection, in other words, this wavelength will be reflected first and it will not pass through the other gratings. The separation of add/drop wavelengths can be done optimising in the same way as in example 2 (example 5).

The difference between the solutions presented above is in how many gratings and optical circulators (couplers) there are in the different alternatives on the path travelled by the bypassing wavelengths and, on the other hand, in how many of these there are on the route of different add/drop wavelengths of the node in question. For this reason, the attenuation experienced by the signals in the concerned node is different, depending on the structure of the node. When the required loop structure is known, that is, the number of nodes, the distances between nodes and the required routing of signals, the total attenuation caused by the route to the signal can be calculated for all the different routes of the optical signals, from one end of the route to the other end. This is possible when the total attenuation caused by the different components is known. Every signal, depending on the type of signal, tolerates a certain maximum total attenuation. Generally a network includes certain such signal routes bypassing several nodes, the distances of which are long. Primarily, the total attenuation experienced by the signal on these routes must be optimised, so that the attenuation would remain below the mentioned maximum total attenuation. The attenuation of critical signals can be optimised e.g. as follows: the critical attenuations in a certain kind of loop are compared with the aid of structural solutions of various alternative add/drop devices and, in addition, the order of gratings in each solution is changed. When the attenuation of the most critical signals is optimised in each node of the network, the total attenuation caused by the entire network will be optimised at the same time.

The structure shown in example 1 is suitable for such a loop, where the number of nodes is small. In such a loop there are few nodes bypassed by the signals and the significance of attenuation on the add/drop path is more essential in relation to bypass attenuation. In the embodiment of example 1, the wavelengths of the most critical signals can be added last as add signals and separated last as drop signals in the node, whereby the add/drop attenuation will also be minimized for their part.

The structure of example 3 is best suitable for a loop having a lot of nodes. The importance of bypass attenuation grows, because the most critical signals will hereby pass by several nodes. The attenuation can be optimised in each node in such a way that the gratings corresponding to the wavelengths of the most critical bypassing signals are located first after gate B1. Hereby it is also possible to add the wavelengths of the most critical signals as add signals last and separate them as drop signals last, whereby the add/drop attenuation is also minimized for their part.

The compensation for dispersion in the network can be implemented in examples 2, 3, 5 and 6, e.g. by using chirped gratings as the grating carrying out the add and/or drop function. In examples 3 and 6, compensation for dispersion can also be done for wavelengths bypassing the grating, whereby chirped gratings are used to reflect these wavelengths.

Although the invention was described above with reference to the examples shown in the appended drawings, it is obvious to the professional that the invention can be changed within the scope of the inventive idea presented above and in the appended claims. For example, the number of direction selective and wavelength selective organs used may vary, depending on the wavelengths used. The number of wavelengths is not necessarily the same as the number of direction selective organs. The number of circulator gates may vary. Likewise, the number of interferometers and the number of gratings in them may vary. Gratings of other kinds than the Fiber Bragg Gratings mentioned in the examples may also be used. The number of network nodes may vary as well as the structure and form of the network. The solution may also be applied in operating environments and applications of different kinds.

What is claimed is:

1. An optical add/drop multiplexer for a node of a telecommunications system, in which telecommunications system a main system signal is transmitted along an optical fiber using wavelength multiplexing, the main system signal including a plurality of signals having associated wavelengths, the plurality of signals being dropped and added in response to the associated wavelengths, the optical add/drop multiplexer comprising:
   a group including:
      at least two direction selective organs having at least three gates; and
      at least one wavelength selective organ located between two direction selective organs, the wavelength selective organs being coupled to add or drop the plurality of signals having a desired wavelength, wherein several groups are connected to one another by optically coupling at least one of the at least three gates of the direction selective organs in the group, a portion of the at least three gates of the direction selective organs being used as gates of the add/drop multiplexer, wherein the gates of the add/drop multiplexer are selected from a group consisting of a unidirectional add gate, a unidirectional drop gate and a bi-directional add/drop gate,
   whereby the function of the add/drop multiplexer is configurable such that those wavelengths which experience most attenuation in the network will correspondingly experience less attenuation in the optical add/drop multiplexer.

2. The add/drop multiplexer according to claim 1, wherein to each bi-directional add/drop gate a direction selective organ is also connected to separate directions from each other.

3. The add/drop multiplexer according to claim 1, wherein the direction selective organs are circulators.

4. The add/drop multiplexer according to claim 1, wherein at least one wavelength selective organ is also located between the groups.

5. The add/drop multiplexer according to claim 1, wherein the groups are Mach-Zehnder interferometers.

6. The add/drop multiplexer according to claim 1, wherein the wavelength selective organs are Fiber Bragg Gratings.

7. The add/drop multiplexer according to claim 5, wherein at least some gratings are implemented as chirped gratings in order to compensate for dispersion.

8. An optical telecommunications network having several nodes, in each node there being an optical add/drop multiplexer in which network wavelength multiplexing is used to transmit along an optical fiber, a main system signal including a plurality of signals having associated wavelengths, a plurality of signals being dropped and added in response to the associated wavelengths, the optical add/drop multiplexer comprising:

a group including:
        at least two direction selective organs having at least three gates; and
        at least one wavelength selective organ located between the at least two direction selective organs, the wavelength selective organs being coupled to add or drop the plurality of signals is having a desired wavelength, wherein several groups are connected to each other by optically coupling at least three gates of the direction selective organs in the group, a portion of the at least three gates of the direction selective organs of the groups being used as gates of the add/drop multiplexer, wherein the gates of the add/drop multiplexer are selected from a group consisting of a unidirectional add gate, a unidirectional drop gate and a bidirectional add/drop gate, whereby the function of the add/drop multiplexer is configurable such that those wavelengths which experience most attenuation in the network will experience correspondingly less attenuation in the optical add/drop multiplexer.

9. The network according to claim 8, wherein the network is an annular WDM network formed by several optical fibers.

10. The network according to claim 9, wherein in the network nodes there is an own optical add/drop multiplexer for each optical fiber.

* * * * *